United States Patent [19]

Schaertel

[11] Patent Number: 5,087,979
[45] Date of Patent: Feb. 11, 1992

[54] DIGITAL COPIER OR PRINTER WITH COLLATING BUFFER MEMORY OF LIMITED PAGE CAPACITY AND WITH ALTERNATIVE PRINTING MODES WHEN REQUIRED MEMORY EXCEEDS CAPACITY

[75] Inventor: Daniel P. Schaertel, Webster, N.Y.

[73] Assignee: Eastman Kodak Company, Rochester, N.Y.

[21] Appl. No.: 632,817

[22] Filed: Dec. 24, 1990

[51] Int. Cl.⁵ .......................... H04N 1/21; H04N 1/23
[52] U.S. Cl. .................................. 358/296; 358/404; 358/444
[58] Field of Search ................ 358/296, 300, 302, 401, 358/404, 444, 498; 355/323; 364/518, 519

[56] References Cited

U.S. PATENT DOCUMENTS

| | | | |
|---|---|---|---|
| 4,751,550 | 6/1988 | Murakami | 355/323 |
| 4,827,354 | 5/1989 | Minor | 358/296 |
| 4,949,190 | 8/1990 | Thompson | 358/498 |

Primary Examiner—Benjamin R. Fuller
Assistant Examiner—Scott A. Rogers
Attorney, Agent, or Firm—Milton S. Sales

[57] ABSTRACT

Reproduction apparatus includes an addressable buffer memory from which stored image signals can be retrieved in a first mode for producing a single collated reproduction set, a second mode for producing plural sets of collated reproductions, and a third mode for producing plural sub-sets of collated reproductions corresponding respectively to first and subsequent subgroups of pages of multiple-page original documents. A finisher selectably staples, folds or otherwise finishes collated reproduction sets, but requires complete sets to operate. An operator may select between the first and third modes when the apparatus is operating in its second mode and the capacity of said buffer memory is exceeded. Selection of a set finishing operation is cancelled upon operator selection of the third mode.

5 Claims, 4 Drawing Sheets

DIGITAL COPIER OR PRINTER WITH COLLATING BUFFER MEMORY OF LIMITED PAGE CAPACITY AND WITH ALTERNATIVE PRINTING MODES WHEN REQUIRED MEMORY EXCEEDS CAPACITY

BACKGROUND OF THE INVENTION

1. Technical Field

This invention relates generally to the production of plural sets of collated copies or prints (collectively referred to herein as "reproductions") from multiple-page original documents, and more particularly to the production of such sets of collated reproductions using digital reproduction apparatus with a collating buffer memory of limited page capacity.

2. Background Art

It is generally known to provide optical copiers with a recirculating document feeder having a hopper into which a multiple-page original document can be loaded for presentation seriatim to a platen. At the platen, one copy is made of each page before the page is returned to the feeder hopper. When all pages have been copied, a set of collated copies is presented. Plural sets of collated copies can be produced by repeating the process as often as needed.

Recently, digital copiers have been proposed in which each page of a hard-copy original is scanned to produce electrical signals representative of the image content of the originals. Digital printers operate on similar electrical signals derived from computers. In this description, the term "original document" is meant to refer to documents to be reproduced, whether in hard-copy or electronic form. The signals are stored in a multiple-page electronic buffer memory having addressable regions. The electrical signals of individual pages are selectively retrieved from the buffer memory in a scheduled order and presented to a writer such that images of the pages are produced on stacked receiver sheets to form a set of collated copies with pages properly sequenced. Additional sets of collated copies can be produced without re-scanning the original document merely by repeatedly retrieving the electrical signals in proper sequence.

Digital copiers and printers such as those described have a predetermined amount of available buffer memory. If the original document exceeds the capacity of the buffer memory, plural sets of collated copies from multiple-page original documents cannot be produced without "batching." Batching involves first reading into buffer memory the image data from a first sub-group of pages of the original document, producing as many sub-sets of collated copies of those pages as desired, reading the image data from a second sub-group of pages of the original document into the buffer memory, producing as many sub-sets of collated copies of those second sub-group pages as desired, and so forth, until all the pages of the original document have been reproduced. The operator assembles the sub-sets to form complete sets of collated copies.

Manual or automatic assembly of batched sub-sets of collated copies is cumbersome, but would generally be acceptable. However, there are certain operational modes in which batching would present an even greater disadvantage. Many copiers are provided with finishers having operations that require the entire set of collated copies. For example, stapling and folding functions cannot be effected unless the entire set is available; something that would not happen in a batch mode.

DISCLOSURE OF INVENTION

It is an object of the present invention to provide copiers and printers of the type described with a mode that permits the completion of an entire set of collated copies, even if the original document exceeds the capacity of the buffer memory.

It is another object of the present invention to provide copiers and printers of the type described with a mode that overrides a request for plural sets of collated copies from multiple-page original documents when the capacity of the buffer memory would be exceeded, such that an entire set of collated copies can be completed.

In accordance with one aspect of the present invention, reproduction apparatus which includes a writer and an addressable buffer memory of predetermined capacity includes a first mode for producing a single reproduction of multiple-page original documents and a second mode for producing plural sets. When operating in the second mode, the apparatus is switchable to the first mode if the capacity of the buffer memory is exceeded.

According to another aspect of the present invention, a third mode may be provided for producing plural sub-sets of collated reproductions corresponding respectively to first and subsequent sub-groups of pages of multiple-page original documents. When operating in the second mode and the capacity of the buffer memory is exceeded, the apparatus is switchable to either the first or third modes.

In a preferred embodiment of the present invention, selectable means, that require complete sets to operate, are provided for finishing sets of collated reproductions of multiple-page original documents. Selection of a set finishing means is cancelled upon operator selection of the third mode.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

In this specification, the term "copier" is meant to refer to apparatus arranged for reading the image information on an original hard copy and for reproducing such image information on a receiver sheet. The term "printer" is meant to refer to apparatus arranged for receiving image information in other than hard copy form and for reproducing such image information on a receiver sheet. The phrase "original document" is meant to refer to image information to be reproduced, whether such image information is in hard copy, electronic, or other form. The term "reproduction apparatus" is meant to refer to copiers and/or printers. The described preferred embodiment takes the form of a copier, but it will be understood that the present invention is applicable to all types of reproduction apparatus.

Figure 1:
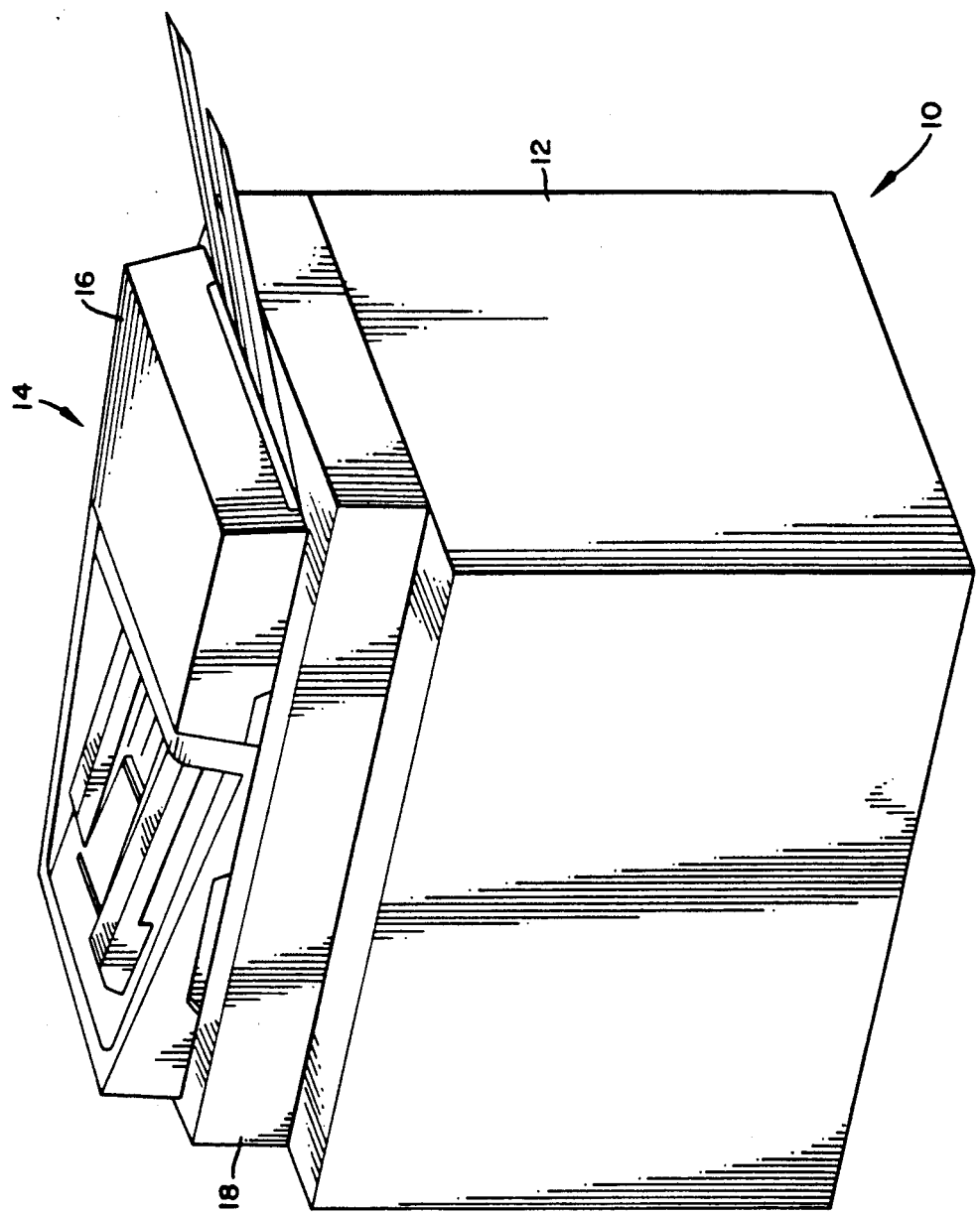
FIG. 1 is a perspective view of a copier according to the present invention.
Figure 2:
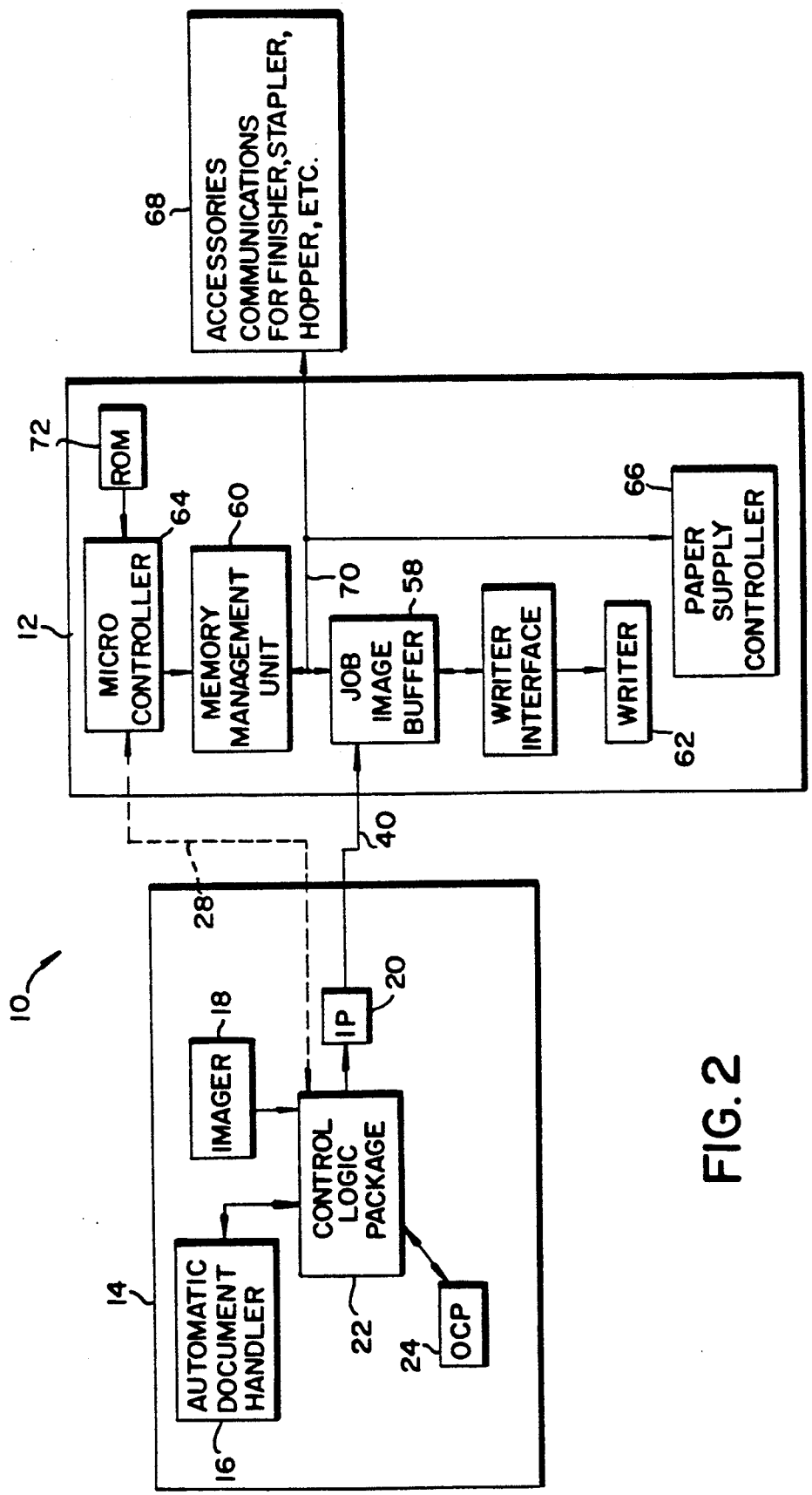
FIG. 2 is a schematic block diagram of a copier of FIG. 1.

According to FIGS. 1 and 2, a copier 10 includes a marking engine 12 and a document scanner 14. Scanner 14 consists of an automatic document handler 16 for stream-feeding multiple-page original documents past an optical imager 18 which converts the image of an original document into a series of electrical signals having values representative of the image density at associated pixel areas on the original document.

The image data may be manipulated by image processing electronics 20 for linearity correction, unsharp masking, image editing, windowing, document recognition, magnification, accent color, color substitution, and so on.

Scanner 14 also includes a control logic package 22 having an operator control panel 24. The operator control panel is interfacing media for the operator to input instruction and to receive messages from the reproduction apparatus. Instructions inputted by the operator at the control panel include machine functions such a collate versus non-collate, stapled copies, the number of copy sets, folded copies, etc.

The logic package consists of control software, interface software, and logic hardware; and is a digital computer, preferably a microprocessor. Programming of a number of commercially available microprocessors is a conventional skill well understood in the art. This disclosure is written to enable a programmer having ordinary skill in the art to produce an appropriate control program for the microprocessor. The particular details of any such program would, of course, depend on the architecture of the designated microprocessor.

Syncronization signals to identify separate scan lines and to provide page information and marking engine control, as well as information for finishing and processing of jobs will be sent to marking engine 12 via a job control communications link 28. The processed image data is transmitted along an image data bus 40 to marking engine 12.

Figure 3:
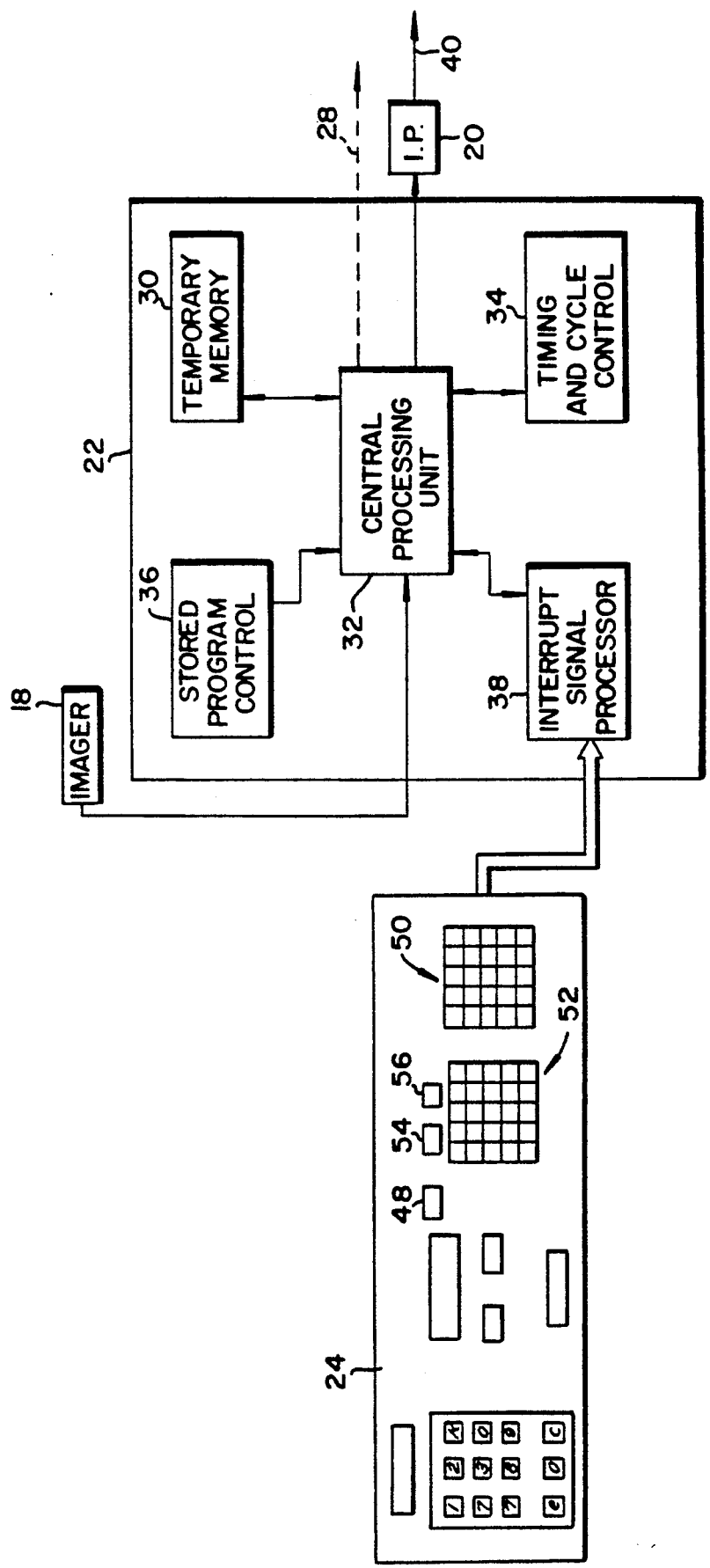
FIG. 3 is a block diagram of the copier shown in FIGS. 1 and 2 showing a logic and control unit.

With reference also now to FIG. 3, control logic package 22 consists of a temporary data storage memory 30, a central processing unit 32, a timing and cycle control unit 34, and a stored program control 36. Data input and output is performed sequentially under program control. Input data are received from imager 18, and control signals are received from operator control panel 24 through an interrupt signal processor 38. The input signals are derived from various switches, sensors, and analog-to-digital converters. The output data and control signals are applied to marking engine 12.

Default machine setup instructions are stored in stored program control 36. An operator uses control panel 24 to input setup instruction values for storage in a temporary memory 30. Alternatively, setup instructions may be received via removable memory media from an off-line computer, or the like. The setup instructions are used by image processing electronics 20 to modify the data from imager 18, or are transmitted as control signals to marking engine 12.

Marking engine 12 receives bit stream image data over image data bus 40 and job control data over communications link 28, both for storage in a job image buffer memory 58, which is a multiple page-memory. The buffer memory will accept electronic image data from scanner 14 (or, in the case of a printer, rasterized data from a computer or the like), and store that data until needed by a writer 62. The storage medium is preferably a dynamic random access memory under the control of a memory management unit 60.

Memory devices may be classified as being either "totally accessible" wherein simultaneous requests for access to two different addresses can be honored, or "not totally accessible" wherein only those addresses in a particular subset can be accessed at the same time. In the embodiment of reproduction apparatus as disclosed herein, the file maintenance problem is not solvable if only one "not totally accessible" memory is used since in normal operation the scanner (or the raster image processor) and the writer will generally not be working out of the same subset. Accordingly, buffer memory 58 should preferably consist of two or more "not totally accessible" memories or at least one "totally accessible" memory.

Control means, including a micro controller 64 is arranged to perform arithmetic and logic operations and instruction decoding as well as controlling the time allocation of peripherals (such as a paper supply controller 66 and accessories 68) through a machine control communications link 70. Several output functions may be available for receiver sheets, including selection of output trays, stapling, sorting, folding, finishing, mailbox, envelope receiver, etc.

As an example of the functions of the elements so far described, it will be assumed that an operator desires to make eight sets of collated copies of a, say, twenty-page original document stacked in automatic document handler 16. The operator sets control panel 24 accordingly. For purposes of this example, it will further be assumed that buffer memory 58 is fully capable of storing the information from at least the twenty pages of the original document.

Now, control logic package 22 starts in a subroutine which is pre-programmed according to the switches on control panel 24 to command scanner 14 to begin operation. Automatic document handler 16 is activated to move a page of the original document into an exposure station of imager 18.

As the scanning progresses, data (including image information and control signals) are received by buffer memory 58. As subsequent pages of the original document are scanned, the processes described above are repeated until all of the pages of the original document have been scanned and the data therefrom stored in buffer memory 58. Because job buffer memory 58 is totally accessible (or there are two or more not totally accessible buffers), data can be removed from the buffer memory and transmitted to the writer at the same time that data is being written to the buffer memory.

Micro controller 64 is pre-programmed with the capacity of buffer memory 58 and with a bookkeeping function to keep track of the data loaded into the memory. Document scanning will be interrupted if the buffer memory is full.

One function of multiple-page buffer memory 58 is to store all the pages of a particular job so that plural sets of collated copies may be produced without re-scanning the pages of the original document for each set produced. As such, automatic document handler 16 need not be capable of recirculating the pages of the original document.

For the production of plural sets of collated copies of a multiple-page original document, with only a single scan of the original document, buffer memory 58 must maintain a complete file of all pages of the original document. If the job is too big, or if the images cannot be adequately compressed, the available memory will be exhausted before all pages can be scanned. The job cannot be completed as requested.

Figure 4:
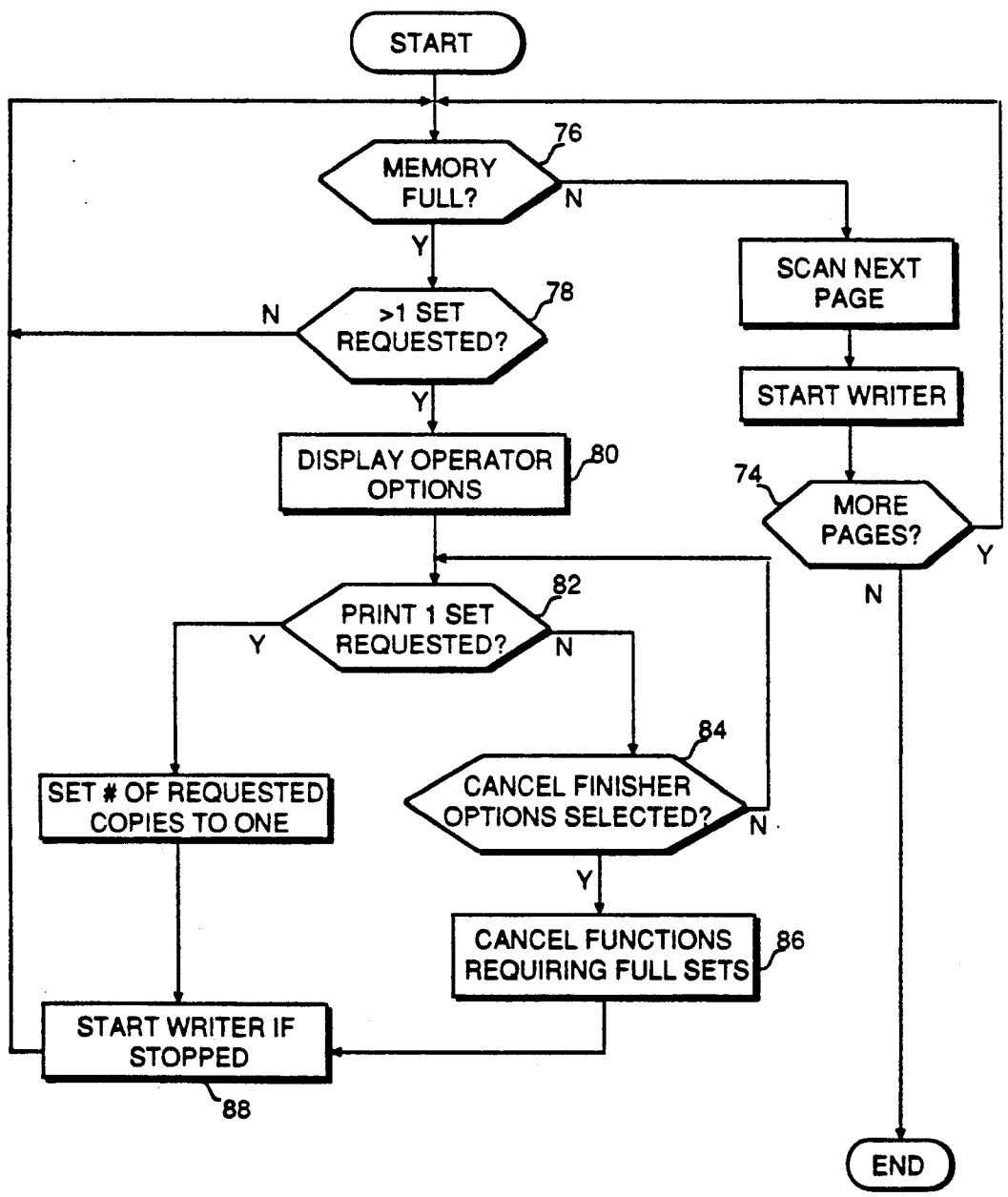
FIG. 4 illustrates a logic flow chart of a recovery procedure according to the present invention.

FIG. 4 illustrates a logic flow chart of a recovery procedure for this event. After the operator has entered setup instructions and pressed the START button on control panel 24, the pages of an original document will be advanced to imager 18 and scanned into buffer memory 58 until either there are no more pages (decision block 74) or buffer memory 58 lacks sufficient capacity to receive an entire page (decision block 76). When data compression is available, some minimum amount of compression may be assumed in deciding whether the buffer memory has sufficient capacity for another page.

Upon receipt of a "memory full" decision when only a single set has been requested (decision block 78), the logic simply waits for the writer to catch up and empty enough memory space for another page. However, all image data for every page of the original document must be retained in buffer memory if plural sets of collated copies have been requested. Upon receipt of a "memory full" decision when plural sets of collated copies have been requested, operator control panel 24 will provide a display prompting the operator to select between either dividing the job into sub-sets of collated copies or producing a single, complete set of collated copies (step 80).

If the operator chooses to produce a single, complete set of collated copies (decision block 82), the scanner waits for the writer to catch up and empty enough memory space for another page. If, on the other hand, the operator selects to divide the job into sub-sets of collated copies (decision block 84), any setup function that requires the presentation of full sets of collated copies to operate will be cancelled from the setup instructions (logic step 86), and the logic will return to the start after starting the writer (step 88).

It can be seen from the above that the present invention presents a solution to a physical limitation in digital copiers with collating buffer memories of limited page capacity. It offers a recovery method for any copier or printer that needs to do full set operations and cannot store the entire multiple page original document.

The invention has been described in detail with particular reference to preferred embodiments thereof, but it will be understood that variations and modifications can be effected within the spirit and scope of the invention.

What is claimed is:

1. Reproduction apparatus comprising:
    a writer;
    an addressable buffer memory means, of predetermined capacity, for storing electrical signals representative of an image content of a plurality of pages of a multiple-page original document;
    means for selectively retrieving said stored signals from the buffer memory by page, and for inputting the retrieved signals to said writer, in a scheduled order of pages, said retrieving and inputting having (1) a first mode for producing a single reproduction of said multiple-page original document and (2) a second mode for producing plural sets of collated reproductions of said multiple-page original document; and
    control means operable in said second mode for selectively switching the apparatus to said first mode when the capacity of said buffer memory is exceeded by the electrical signals of said multiple-page original document.

2. Reproduction apparatus comprising:
    a writer;
    an addressable buffer memory means, of predetermined capacity, for storing electrical signals representative of an image content of a plurality of pages of a multiple-page original document;
    means for selectively retrieving said stored signals from the buffer memory by page, and for inputting the retrieved signals to said writer, in a scheduled order of pages, said retrieving and inputting having (1) a first mode for producing a single reproduction of said multiple-page original document, (2) a second mode for producing plural sets of collated reproductions of said multiple-page original document, and (3) a third mode for producing plural sub-sets of collated reproductions corresponding respectively to first and subsequent sub-groups of pages of said multiple-page original document; and
    control means operable in said second mode for selectively switching the apparatus to said first mode when the capacity of said buffer memory is exceeded by the electrical signals of said multiple-page original document.

3. Reproduction apparatus comprising:
    a writer;
    an addressable buffer memory means, of predetermined capacity, for storing electrical signals representative of an image content of a plurality of pages of a multiple-page original document;
    means for selectively retrieving said stored signals from the buffer memory by page, and for inputting the retrieved signals to said writer, in a scheduled order of pages, said retrieving and inputting having (1) a first mode for producing a single reproduction of said multiple-page original document, (2) a second mode for producing plural sets of collated reproductions of said multiple-page original document, and (3) a third mode for producing plural sub-sets of collated reproductions corresponding respectively to first and subsequent sub-groups of pages of said multiple-page original document; and
    control means for providing for operator selection between said first and third modes when the retrieving and imputting means is set to operate in said second mode and the capacity of said buffer memory is exceeded by the electrical signals of said multiple-page original document.

4. Reproduction apparatus comprising:
    a writer;
    an addressable buffer memory means, of predetermined capacity, for storing electrical signals representative of an image content of a plurality of pages of a multiple-page original document;
    means for selectively retrieving said stored signals from the buffer memory by page, and for inputting the retrieved signals to said writer, in a scheduled order of pages, said retrieving and inputting having (1) a first mode for producing a single reproduction of said multiple-page original document, (2) a second mode for producing plural sets of collated reproductions of said multiple-page original document, and (3) a third mode for producing plural sub-sets of collated reproductions corresponding respectively to first and subsequent sub-groups of pages of said multiple-page original document;

selectable means for finishing sets of collated reproductions of said multiple-page original document, said finishing means requiring complete sets to operate;

control means for providing for operator selection between said first and third modes when the retrieving and imputting means is set to operate in said second mode and the capacity of said buffer memory is exceeded by the electrical signals of said multiple-page original document; and means for cancelling a selection of a set finishing means upon said operator selection of said third mode.

5. Reproduction apparatus comprising:

a writer;

an addressable buffer memory means, of predetermined capacity, for storing electrical signals representative of an image content of a plurality of pages of a multiple-page original document;

means for selectively retrieving said stored signals from the buffer memory by page, and for inputting the retrieved signals to said writer, in a scheduled order of pages, said retrieving and inputting having (1) a first mode for producing plural sets of collated reproductions of said multiple-page original document and (2) a second mode for producing plural sub-sets of collated reproductions corresponding respectively to first and subsequent sub-groups of pages of said multiple-page original document;

selectable means for finishing sets of collated reproductions of said multiple-page original document, said finishing means requiring complete sets to operate;

control means operable in said first mode for selectively switching the apparatus to said second mode when the capacity of said buffer memory is exceeded by the electrical signals of said multiple-page original document; and means for cancelling a selection of a set finishing means upon switching the apparatus to said second mode.

* * * * *